United States Patent
Qiu et al.

(10) Patent No.: US 9,300,720 B1
(45) Date of Patent: Mar. 29, 2016

(54) SYSTEMS AND METHODS FOR PROVIDING USER INPUTS TO REMOTE MOBILE OPERATING SYSTEMS

(71) Applicant: Trend Micro Incorporated, Tokyo (JP)

(72) Inventors: Yinfeng Qiu, Nanjing (CN); Yaozhou Xu, Nanjing (CN); Gen Chen, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 289 days.

(21) Appl. No.: 13/902,013

(22) Filed: May 24, 2013

Related U.S. Application Data

(60) Provisional application No. 61/825,839, filed on May 21, 2013.

(51) Int. Cl.
| | |
|---|---|
| *H04L 15/16* | (2006.01) |
| *H04L 29/08* | (2006.01) |
| *H04L 12/66* | (2006.01) |
| *G06F 9/44* | (2006.01) |
| *G06F 9/455* | (2006.01) |
| *G06F 3/0488* | (2013.01) |

(52) U.S. Cl.
CPC ............ *H04L 67/04* (2013.01); *G06F 3/04883* (2013.01); *G06F 9/4445* (2013.01); *G06F 9/45504* (2013.01); *H04L 12/66* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 6,091,412 A | 7/2000 | Simonoff et al. | |
| 6,356,931 B2 | 3/2002 | Isamel et al. | |
| 6,401,134 B1 | 6/2002 | Razavi et al. | |
| 6,433,794 B1 | 8/2002 | Beadle et al. | |
| 6,492,995 B1 | 12/2002 | Atkin et al. | |
| 6,647,544 B1 | 11/2003 | Ryman et al. | |
| 6,757,895 B1 | 6/2004 | Beadle et al. | |
| 6,799,195 B1 | 9/2004 | Thibault et al. | |
| 6,842,777 B1 | 1/2005 | Tuli | |

(Continued)

FOREIGN PATENT DOCUMENTS

| | | |
|---|---|---|
| EP | 1 316 873 | 4/2003 |
| EP | 1 377 892 | 9/2004 |

(Continued)

OTHER PUBLICATIONS

Chen et al. ("Android/OSGi Based Vehicular Network management System" Computer Communications 34, No. 2 (2011), pp. 169-183; herein referred to as Chen).*

(Continued)

*Primary Examiner* — Ranodhi Serrao
*Assistant Examiner* — James Fiorillo
(74) *Attorney, Agent, or Firm* — Okamoto & Benedicto LLP

(57) ABSTRACT

A virtual mobile infrastructure includes a mobile client device running a local mobile operating system and a server computer running a remote mobile operating system. The mobile client device displays a screen image of the remote mobile operating system. User text inputs for a remote application running on the remote mobile operating system are received by way of a touchscreen keyboard of a local input method editor (IME) of the local mobile operating system. The user text inputs are transmitted from the mobile client device to the server computer, where the text inputs are provided to the remote application by a virtual IME of the remote mobile operating system.

11 Claims, 12 Drawing Sheets

(56) References Cited

U.S. PATENT DOCUMENTS

| | | |
|---|---|---|
| 6,842,897 B1 | 1/2005 | Beadle et al. |
| 6,941,552 B1 | 9/2005 | Beadle et al. |
| 6,976,059 B1 | 12/2005 | Rogalski et al. |
| 7,039,691 B1 | 5/2006 | Turnidge |
| 7,191,211 B2 | 3/2007 | Tuli |
| 7,290,129 B2 | 10/2007 | Chebolu et al. |
| 7,506,257 B1 | 3/2009 | Chavez et al. |
| 7,634,811 B1 | 12/2009 | Kienzle et al. |
| 7,735,138 B2 | 6/2010 | Zhao |
| 8,023,974 B1 | 9/2011 | Diao et al. |
| 8,024,790 B2 | 9/2011 | Zhao et al. |
| 8,239,918 B1 | 8/2012 | Cohen |
| 2001/0054062 A1 | 12/2001 | Ismael et al. |
| 2002/0129281 A1 | 9/2002 | Hatfalvi et al. |
| 2003/0041106 A1 | 2/2003 | Tuli |
| 2004/0148608 A1 | 7/2004 | Gendreau et al. |
| 2004/0158830 A1 | 8/2004 | Chung et al. |
| 2004/0230643 A1 | 11/2004 | Thibault et al. |
| 2005/0188361 A1 | 8/2005 | Cai et al. |
| 2005/0198485 A1 | 9/2005 | Nguyen et al. |
| 2005/0246176 A1 | 11/2005 | Creamer et al. |
| 2006/0112342 A1 | 5/2006 | Bantz et al. |
| 2007/0079244 A1 | 4/2007 | Brugiolo |
| 2007/0199058 A1 | 8/2007 | Baumgart et al. |
| 2011/0167474 A1 | 7/2011 | Sinha |
| 2012/0089906 A1* | 4/2012 | Reeves ............. H04L 67/1095 715/255 |
| 2012/0331532 A1* | 12/2012 | Walters ............. H04L 12/66 726/5 |
| 2013/0080805 A1* | 3/2013 | Vick ............. G06F 8/4432 713/320 |
| 2013/0239069 A1* | 9/2013 | Jeong ............. G06F 3/04883 715/863 |
| 2014/0194094 A1* | 7/2014 | Ahuja ............. G06F 21/53 455/410 |
| 2014/0282465 A1* | 9/2014 | Matenaar ............. G06F 9/45504 717/168 |
| 2014/0282608 A1* | 9/2014 | Biancalana ............. G06F 9/544 719/312 |
| 2014/0289637 A1* | 9/2014 | Coviello ............. G06F 9/4445 715/738 |

FOREIGN PATENT DOCUMENTS

| | | |
|---|---|---|
| WO | 02/084459 | 10/2002 |
| WO | 03/017068 | 2/2003 |
| WO | 2005066786 | 7/2005 |

OTHER PUBLICATIONS

Chen et al. ("Android/OSGi Based Vehicular Network management System" Computer Communications 34, No. 2 (2011), pp. 169-183.*

Hadeel Tariq Al-Rayes, "Studying Main Differences between Android & Linux Operating Systems", Oct. 2012, pp. 46-49, vol. 12, No. 5, International Journal of Electrical & Computer Sciences IJECS-IJENS.

* cited by examiner

SYSTEMS AND METHODS FOR PROVIDING USER INPUTS TO REMOTE MOBILE OPERATING SYSTEMS

CROSS-REFERENCE TO RELATED APPLICATION

This application claims the benefit of U.S. Provisional Application No. 61/825,839, filed on May 21, 2013, which is incorporated herein by reference in its entirety.

BACKGROUND OF THE INVENTION

1. Field of the Invention

The present invention relates generally to mobile devices, and more particularly but not exclusively to computing infrastructures for supporting operation of mobile devices.

2. Description of the Background Art

Mobile devices, such as smartphones and tablets, have become commonplace and are now employed as replacements for portable (e.g., laptops and netbooks) and desktop (e.g., personal computers) computing devices. For example, smartphones are now employed not just to make voice calls over traditional mobile telephone networks, but also to browse the Internet, watch streamed video, and play online games. Some employers even allow employees to bring their own devices, the so-called BYOD policy.

One problem with mobile devices is that they run mobile operating systems, such as the ANDROID and the iOS operating systems. Unlike traditional desktop operating systems, such as the WINDOWS operating system, mobile operating systems are not as powerful and extensible, allowing them to run securely on a mobile device that has limited computing resources. Accordingly, mobile devices running mobile operating systems cannot readily take advantage of some computing infrastructures available to computers that run desktop operating systems.

SUMMARY

In one embodiment, a virtual mobile infrastructure includes a mobile client device running a local mobile operating system and a server computer running a remote mobile operating system. The mobile client device displays a screen image of the remote mobile operating system. User text inputs for a remote application running on the remote mobile operating system are received by way of a touchscreen keyboard of a local input method editor (IME) of the local mobile operating system. The user text inputs are transmitted from the mobile client device to the server computer, where the text inputs are provided to the remote application by a virtual IME of the remote mobile operating system.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
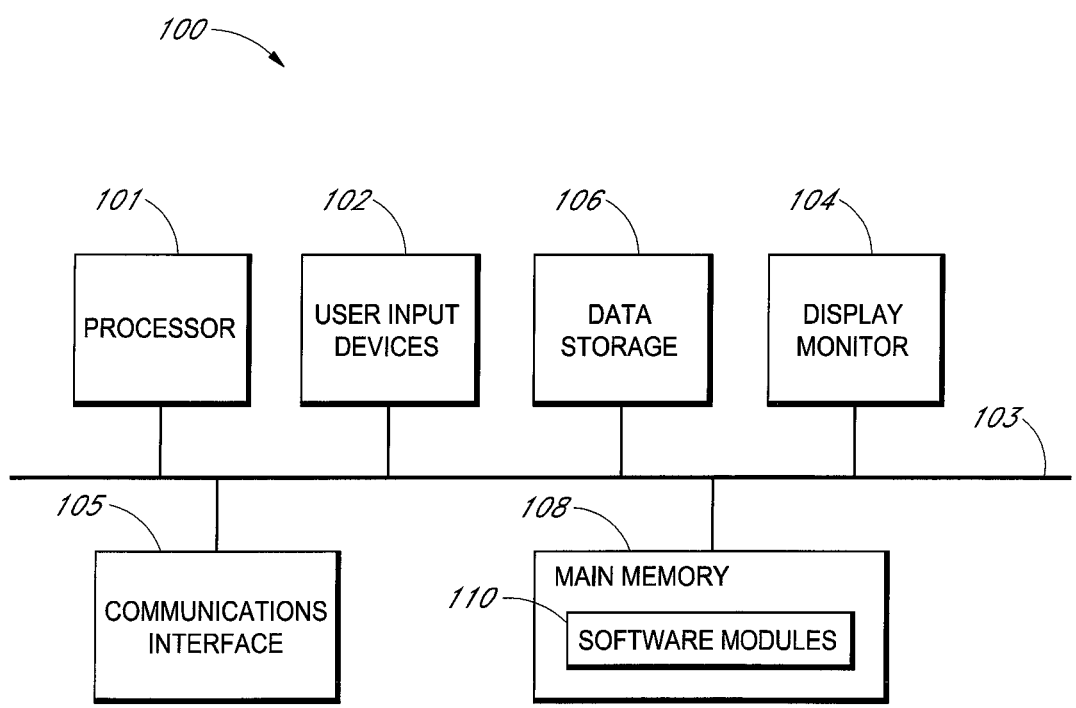
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a mobile client device, a server computer for a virtual mobile infrastructure, and other devices described below. The computer 100 may have fewer or more components to meet the needs of a particular application. The computer 100 may include a processor 101. The processor 101 may comprise an ARM processor when the computer 100 is a mobile client device or an x86 processor when the computer 100 is a server computer, for example. The computer 100 may have one or more buses 103 coupling its various components. The computer 100 may include one or more user input devices 102 (e.g., keyboard, touchscreen), one or more data storage devices 106 (e.g., flash memory, universal serial bus (USB) drive), a display monitor 104 (e.g., touchscreen, liquid crystal display), one or more communications interfaces 105 (e.g., network adapter, cellular interface), and a main memory 108 (e.g., random access memory). The computer 100 is a particular machine as programmed with software modules 110. The software modules 110 comprise computer-readable program code stored non-transitory in the main memory 108 for execution by the processor 101.

Figure 2:
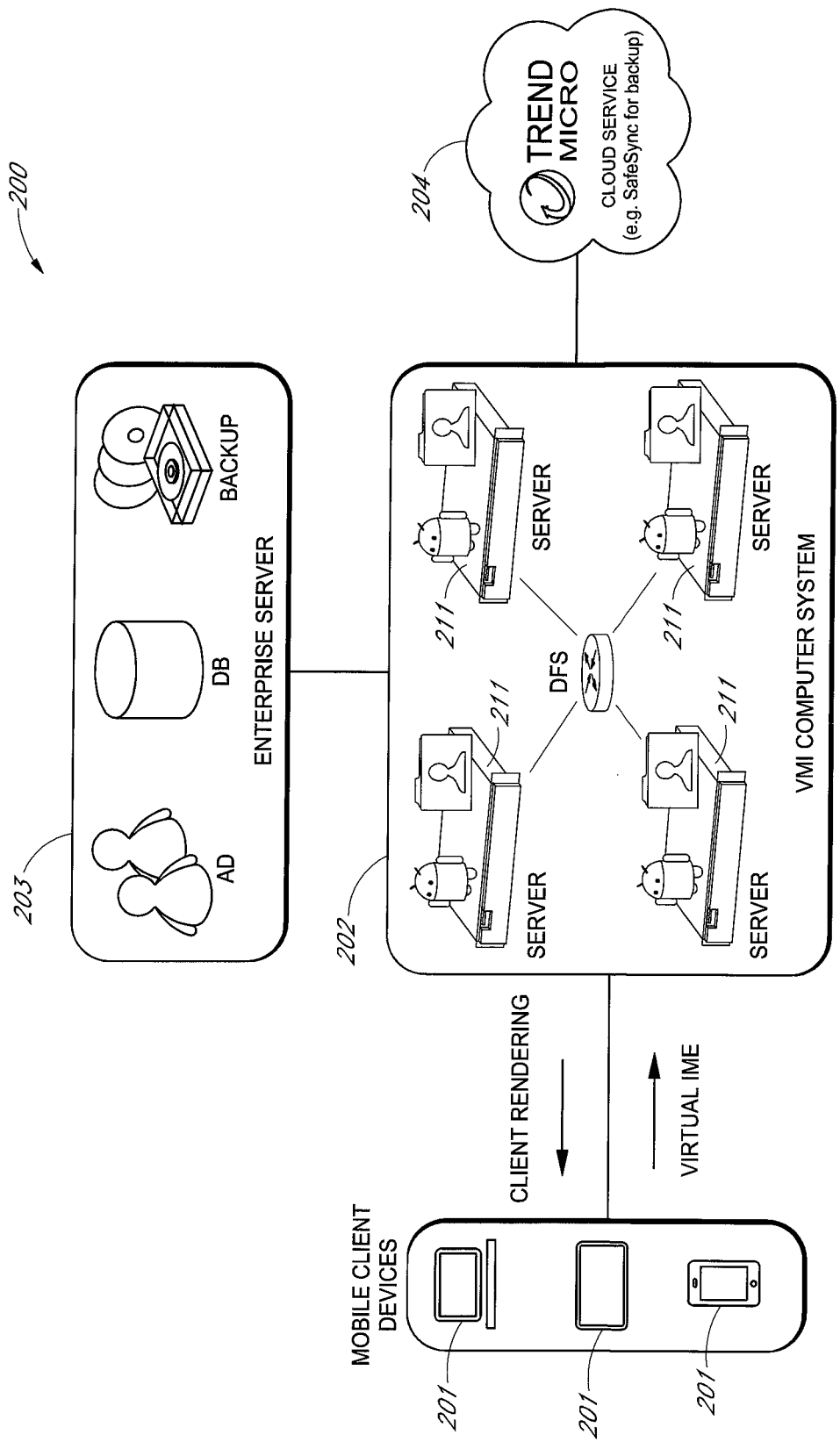
FIG. 2 shows a schematic diagram of a virtual mobile infrastructure in accordance with an embodiment of the present invention.

FIG. 2 shows a schematic diagram of a virtual mobile infrastructure (VMI) 200 in accordance with an embodiment of the present invention. In the example of FIG. 2, the virtual mobile infrastructure 200 includes a VMI computer system 202. The VMI computer system 202 may include a plurality of server computers 211, with each server computer 211 running a plurality of mobile operating systems. As its name implies, a mobile operating system is an operating system designed to run on mobile devices, which are also referred to as "handheld devices." Examples of mobile devices include smartphones and tablets.

A mobile operating system is lightweight in that it consumes less computing resources, such as processor and memory resources, compared to desktop operating systems. A mobile operating system also supports communications over a mobile phone network, such as a cellular network, to provide telephony. In one embodiment, a server computer 211 comprises a single LINUX operating system server that runs several mobile operating systems in the form of ANDROID operating systems, with each ANDROID operating system being implemented on a LINUX container. A mobile operating system running on a server computer 211 is also referred to herein as a "remote mobile operating system" to distinguish it from a corresponding mobile operating system running on a mobile client device 201. In general, components on a mobile client device 201 are referred to herein as "local" components, and components on the server computer 211 are referred to herein as "remote" components.

In the example of FIG. 2, the virtual mobile infrastructure 200 includes one or more mobile client devices 201, with each mobile client device 201 comprising a mobile device that runs a mobile operating system. The mobile operating system of a mobile client device 201 may be the same as a corresponding remote mobile operating system running on a server computer 211. In one embodiment, the mobile client devices 201 each comprises a smartphone or tablet that runs the ANDROID operating system. An ANDROID operating system running on a mobile client device 201 is also referred to herein as a "local ANDROID operating system" and an ANDROID operating system running on a server computer 211 is also referred to herein as a "remote ANDROID operating system."

In other embodiments, a mobile operating system of a mobile client device 201 and a corresponding remote mobile operating system may be different mobile operating systems. For example, a mobile client device 201 may be running an iOS operating system and the remote mobile operating systems may be ANDROID operating systems.

A mobile client device 201 may communicate with the VMI computer system 202 to access one of a plurality of remote mobile operating systems running on a server computer 211 over a computer network, which may include the Internet and/or a private computer network. The remote mobile operating system, which comprises the ANDROID operating system in this example, includes a plurality of remote application programs (also commonly known as "applications" or "apps"). A user of the mobile client device 201 accesses the remote apps on the remote ANDROID operating system as if the remote apps are running on the mobile client device 201. For example, the screen image of the remote ANDROID operating system is displayed on the touchscreen of the mobile client device 201. The user may even replace the mobile client device 201 with another mobile client device 201 to access the same remote apps on the same remote ANDROID operating system. This is particularly advantageous in workplaces that allow employees to use their own personal mobile client devices. In particular, employees with different mobile client devices 201 can work on remote apps running on remote mobile operating systems that are owned and managed by their employers.

The ANDROID operating system is a so-called "touchscreen mobile operating system" in that it is primarily designed to work with touchscreen-enabled smartphones and tablets. These smartphones and tablets do not have physical keyboards. Instead, they have touchscreen keyboards (also known as "virtual keyboards") that are displayed on the touchscreen. Accordingly, the ANDROID operating system has provisions for an input method editor (IME) that allows a user to enter text by way of a touchscreen keyboard displayed by the IME. In one embodiment, a mobile client device 201 may provide text inputs to a corresponding remote ANDROID operating system using a local IME of the local ANDROID operating system. The text inputs are received by a local IME of a client application, which provides the text inputs to a virtual IME running on the remote ANDROID operating system. The virtual IME provides the user inputs to the corresponding remote application running on the remote ANDROID operating system.

In one embodiment, the VMI 200 employs client-side rendering to display a screen image of a remote ANDROID operating system on the mobile client device 201. More specifically, the final screen image of the remote ANDROID operating system may be completed locally on the mobile client device 201. For example, data for drawing surfaces and data for compositing the surfaces to create a final screen image may be generated on the remote ANDROID operating system and then sent to the mobile client device 201. There, the final screen image is generated by locally drawing the surfaces and compositing the surfaces on the local ANDROID operating system.

Client-side rendering minimizes network bandwidth consumption by not having to transmit the final screen image over the computer network. However, graphics generation, in general, is computation intensive and increases battery consumption. In one embodiment, a mobile client device 201 performs client-side rendering during normal operation, but changes to server-side rendering when its battery level is below a certain battery threshold. With server-side rendering, the final screen image is generated on the remote ANDROID operating system and the pixel information of the final screen image is sent to the mobile client device 201.

In the example of FIG. 2, the plurality of server computers 211 of the VMI computer system 202 may share data storage devices by way of, for example, a distributed file system (DFS). The VMI computer system 202 may also take advantage of cloud services 204, such as remote backups, and other computing infrastructures, such as administrator (AD) support, database (DB) access, and backup services, that are typically available in an enterprise network.

Figure 3:
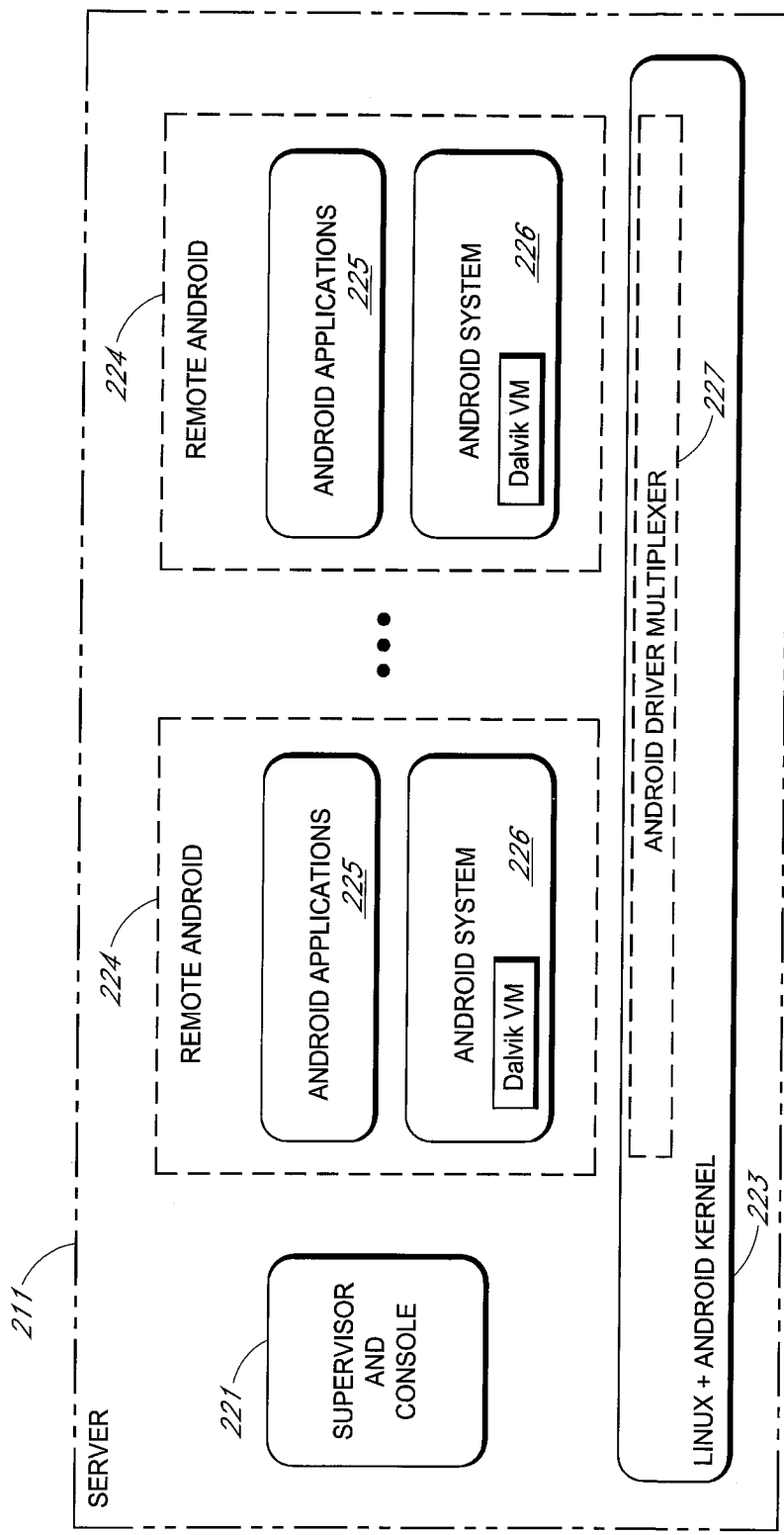
FIG. 3 shows a schematic diagram of a server computer running a plurality of ANDROID operating systems in accordance with an embodiment of the present invention.

FIG. 3 shows a schematic diagram of a server computer 211 running a plurality of ANDROID operating systems in accordance with an embodiment of the present invention. In one embodiment, the components shown in FIG. 3 comprise computer-readable program code that may be stored in main memory and executed by a processor of the server computer 211. In the example of FIG. 3, the server computer 211 runs the LINUX operating system, which supports a plurality of remote ANDROID operating systems 224. In one embodiment, each remote ANDROID operating system 224 is implemented in its own, separate LINUX container. That is, each server computer 211 runs a plurality of LINUX containers, with each container supporting an ANDROID operating system.

Figure 4:
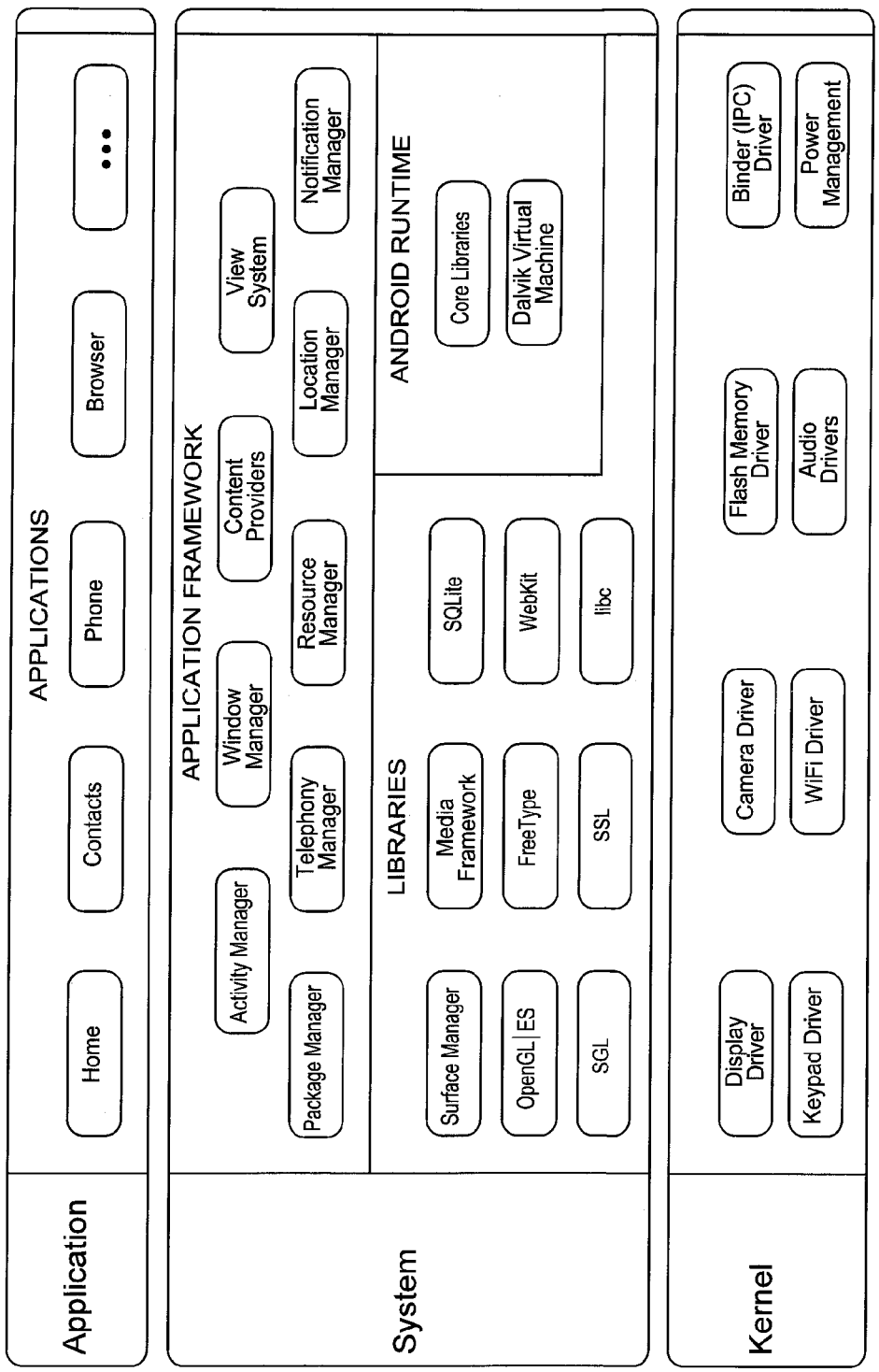
FIG. 4 shows the three layers of an ANDROID operating system.

As is well known, an ANDROID operating system has three layers, namely, an ANDROID application layer, an ANDROID system layer, and a LINUX kernel. Referring to FIG. 4, which shows the three layers of an ANDROID operating system, the ANDROID application layer is the topmost layer and includes the applications. Below the ANDROID application layer is the ANDROID system layer, which includes the application framework, the libraries, and the ANDROID runtime. The ANDROID runtime includes a Dalvik process virtual machine, which is a process virtual machine for running an application. In contrast to a system virtual machine, which supports execution of an entire operating system, a process virtual machine supports execution of a single program. The ANDROID system runs on top of a LINUX kernel, which provides device drivers and other kernel functions.

In marked contrast to hosted virtualization where each virtual machine has its own guest operating system that runs on and is separate from a host operating system, the ANDROID operating systems 224 of the server computer 211 share the same LINUX kernel. More particularly, each ANDROID operating system 224 has its own applications 225 and an ANDROID system 226 with a Dalvik process virtual machine. However, all of the remote ANDROID operating systems 224 share the same, single kernel 223; a container does not have a kernel. In one embodiment, the kernel 223 includes a LINUX kernel and additional ANDROID kernel drivers for supporting an ANDROID operating system. The ANDROID kernel drivers are merged with the LINUX kernel to create the kernel 223, which is then made the boot kernel of the LINUX operating system of the server computer 211. The server computer 211 may comprise an x86 processor that runs the LINUX operating system, and thus includes a LINUX kernel in the form of the kernel 223, and a LINUX supervisor and console 221.

In one embodiment, the kernel 223 includes an ANDROID driver multiplexer 227, which comprises computer-readable program code for allowing multiple ANDROID systems 226 to access the same kernel device driver. The ANDROID driver multiplexer 227 multiplexes several ANDROID systems 226 to a single kernel device driver as now explained with reference to FIG. 5.

Figure 5:
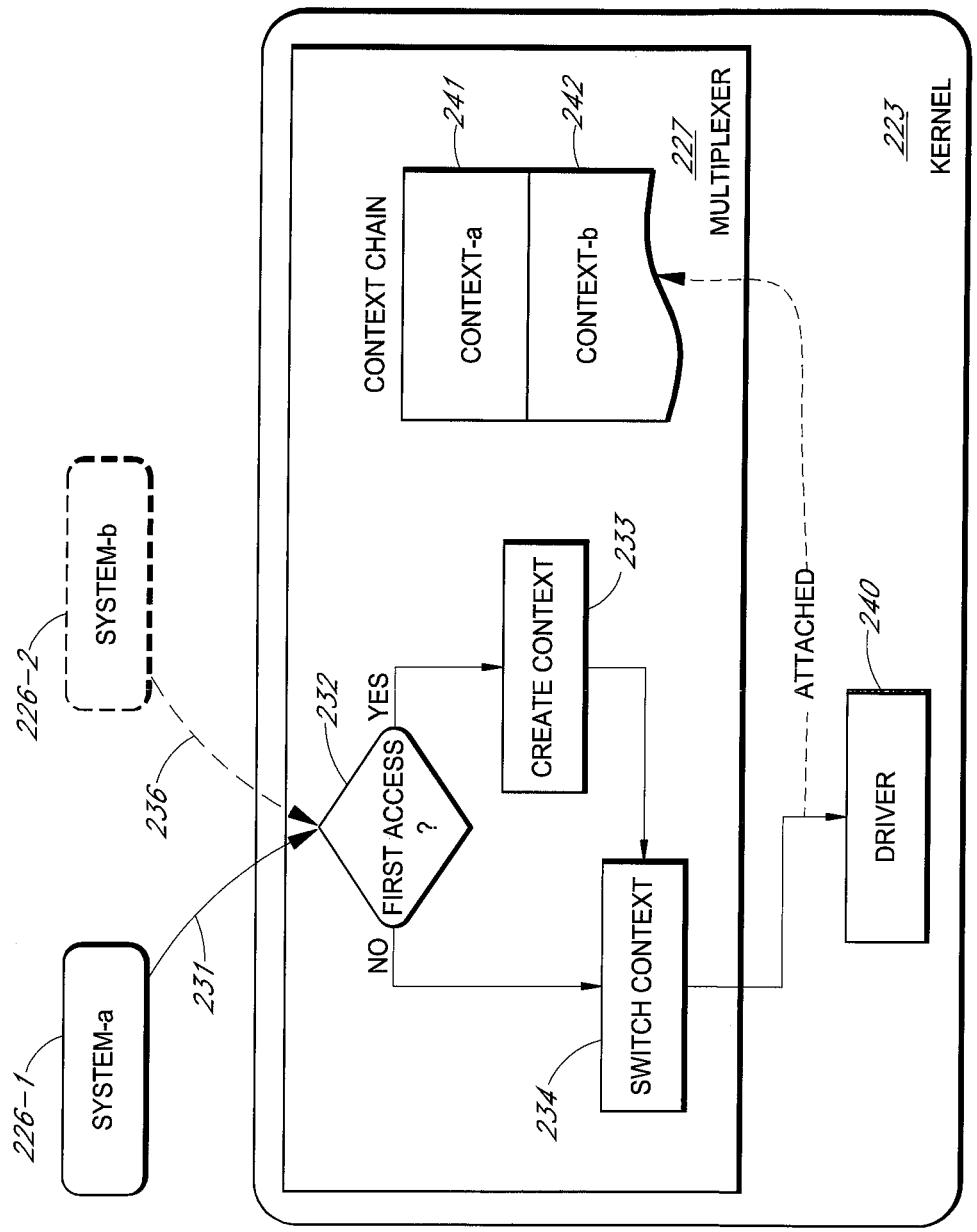
FIG. 5 shows a flow diagram of a method of multiplexing a plurality of ANDROID operating systems to a single kernel driver in accordance with an embodiment of the present invention.

FIG. 5 shows a flow diagram of a method of multiplexing a plurality of ANDROID operating systems to a single kernel driver in accordance with an embodiment of the present invention. In one embodiment, the method of FIG. 5 is performed by the ANDROID driver multiplexer 227. In the example of FIG. 5, the ANDROID system 226-1 is of a first ANDROID operating system 224 on a container, and the ANDROID system 226-2 is of a second ANDROID operating system 224 on its own, separate container. The driver multiplexer 227 allows both ANDROID systems 226-1 and 226-2 to access the same kernel device driver 240 on the kernel 223, one after another.

In the example of FIG. 5, the driver multiplexer 227 creates a context for an ANDROID system 226 if one is not available. A context comprises a set of data saved for an ANDROID system 226. When an ANDROID system 226 accesses a kernel device driver, the driver multiplexer 227 checks to see if this is the first time the ANDROID system 226 accesses the driver (step 232). If so, the driver multiplexer 227 creates a context for accessing the driver for the ANDROID system (step 233). When the ANDROID system 226 has previously accessed the driver, the driver multiplexer 227 simply retrieves the saved context for the ANDROID system 226 and switches to that context (step 234) to access the driver.

In the example of FIG. 5, the ANDROID system 226-1 makes a request to access the kernel device driver 240 (see arrow 231). If this is the first time the ANDROID system 226-1 is accessing the kernel device driver 240, the driver multiplexer 227 creates a context 241 for the ANDROID system 226-1. The driver multiplexer 227 switches to the context 241 to allow the ANDROID system 226-1 to access the kernel device driver 240. The driver multiplexer 227 saves all context data for the ANDROID system 226-1 to the context 241. Thereafter, the ANDROID system 226-2 makes a request to access the kernel device driver 240 (see arrow 236). In this example, the ANDROID system 226-2 already has a saved context 242. Accordingly, the driver multiplexer 227 simply switches from the context 241 (or some other previous context) to the context 242 to allow the ANDROID system 226-2 to access the kernel device driver 240.

Figure 6:
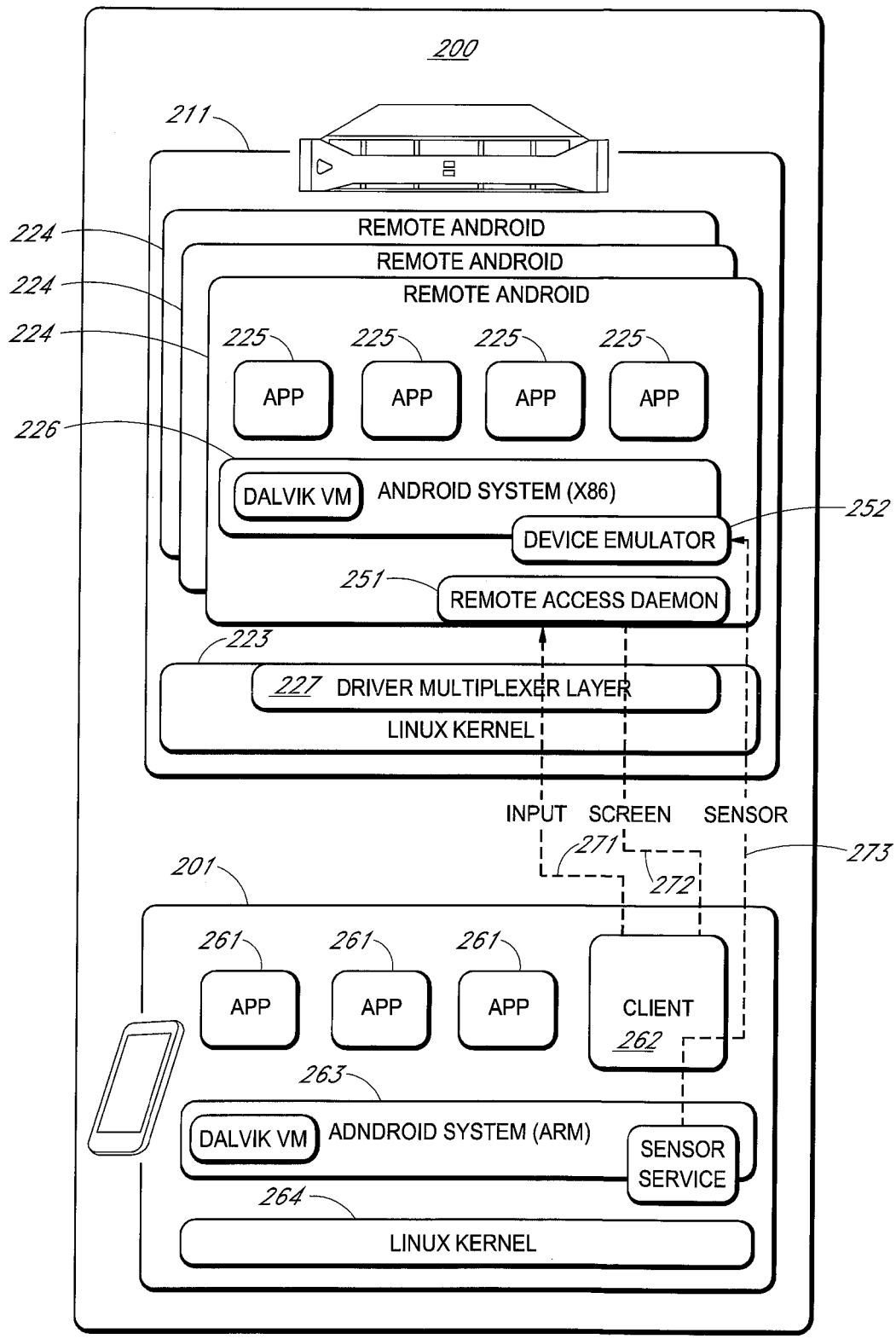
FIG. 6 shows a schematic diagram illustrating components of a server computer and a mobile client device in accordance with an embodiment of the present invention.

FIG. 6 shows a schematic diagram illustrating the components of a server computer 211 and a client device 201 in accordance with an embodiment of the present invention. As shown in FIG. 6, a server computer 211 may be running a plurality of remote ANDROID operating systems 224. A remote ANDROID operating system 224 includes a plurality of applications 225 on an application layer and an ANDROID system 226 with its Dalvik process virtual machine for executing the applications 225. A device emulation 252 allows the ANDROID system 226, which is typically designed to operate on an ARM processor, to run on the x86 processor of the server computer 211. In one embodiment, each remote ANDROID operating system 224 includes a remote access daemon 251 for communicating with and servicing service requests from a client application 262 running on the mobile client device 201.

In the example of FIG. 6, the client mobile device 201 may comprise a conventional smartphone running a local ANDROID operating system. The local ANDROID operating system has a plurality of applications 261 on an application layer, an ANDROID system 263, and a LINUX kernel 264. The ANDROID system 263 has a Dalvik process virtual machine for executing the applications 261 on the ARM processor of the client mobile device 201.

In one embodiment, the client mobile device 201 includes the client application 262. In one embodiment, the client application 262 comprises computer-readable program code for communicating and interfacing with a remote ANDROID operating system 224 running on the server computer 211 to allow a user of the client mobile device 201 to access a remote application 225 Like other applications, the client application 262 is running on application layer of the local ANDROID operating system.

Figure 7:
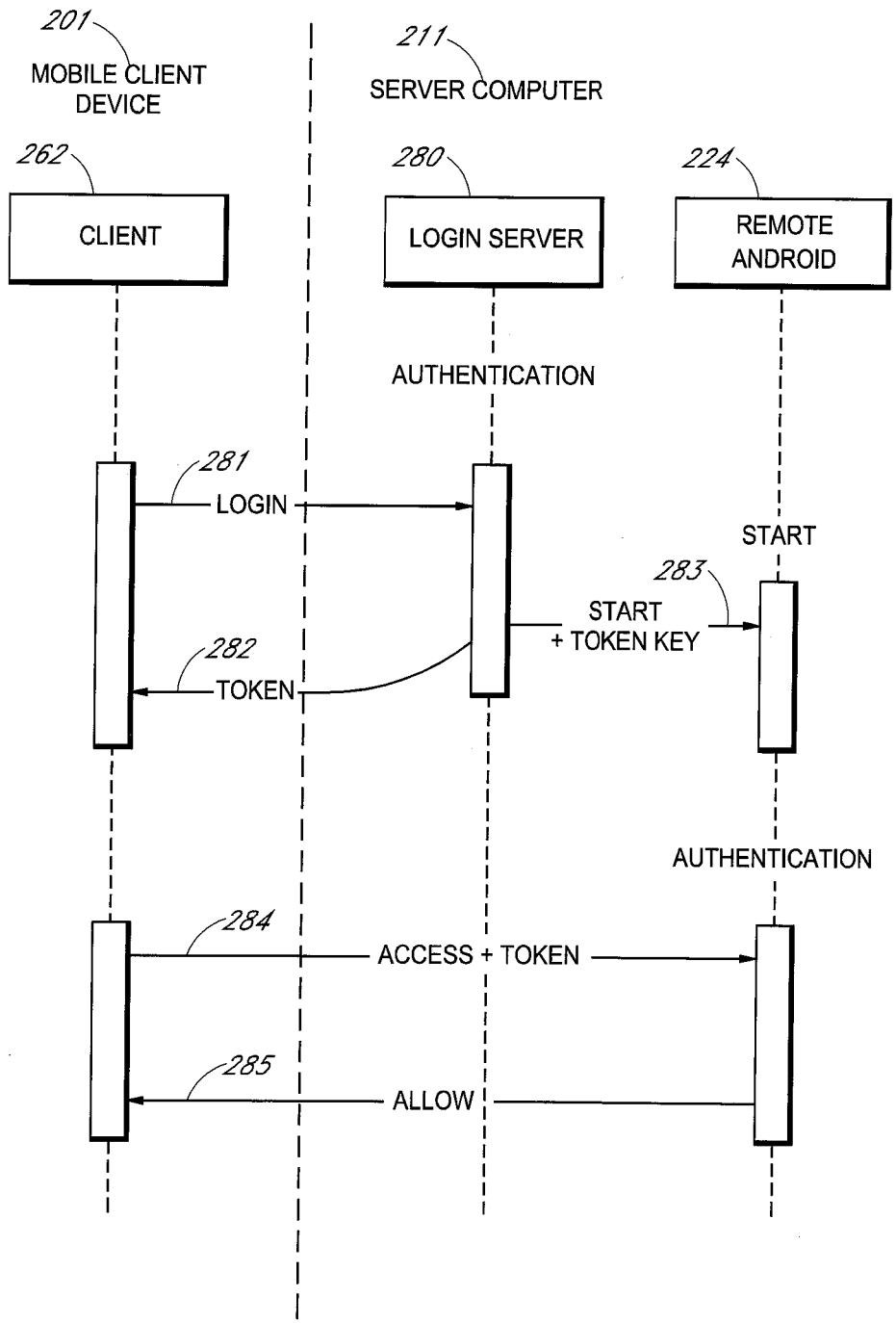
FIG. 7 shows a flow diagram of a method of logging into one of a plurality of ANDROID operating systems in accordance with an embodiment of the present invention.

Referring to FIG. 7, the client application 262 may connect to one of the plurality of remote ANDROID operating systems 224 by way of a login server 280 running on the server computer 211. During a registration process, the client application 262 logs into the login server 280 to provide a username and password for accessing a particular remote ANDROID operating system 224 (see arrow 281). When the client application 262 has been authenticated as being authorized to access the remote ANDROID operating system 224, the login server 280 provides the client application 262 the remote ANDROID's 224 connection address and a security token (see arrow 282). Thereafter, the client application 262 may connect to the remote ANDROID operating system 224 by providing access information (e.g., the username and password) and the security token (see arrow 284). The remote ANDROID operating system 22 allows access to the client application 262 after authenticating the client application 262 (see arrow 285).

Continuing with FIG. 6, on the server computer 211, a remote access daemon 221 receives user inputs (see arrow 271) and sensor information (see arrow 273; e.g., accelerometer or gyroscope information of the client device 201) from the client application 262 and provides the user inputs and sensor information to a corresponding component on the remote ANDROID operating system 224. In the case of client-side rendering, the remote access daemon 221 may receive screen data for generating a final screen image and provide the screen data to the mobile client device 201, where the screen data are processed to locally generate the final screen image for display on the touchscreen of the mobile client device 201. As will be more apparent below, the screen data may comprise drawing API calls and compositing data intercepted on the remote ANDROID operating system 224 and redirected to the client application 262 on the local ANDROID operating system.

Figure 8:
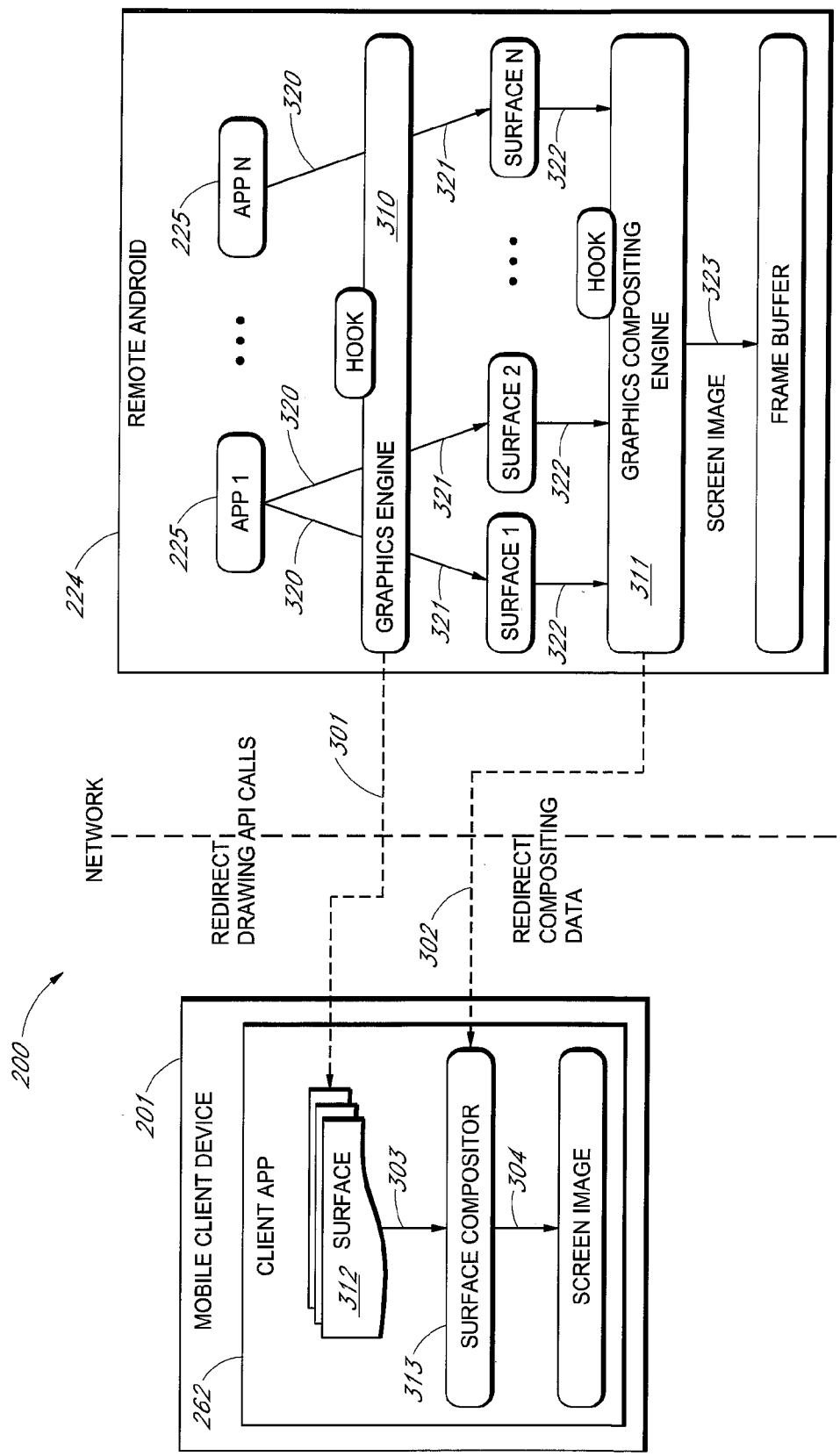
FIG. 8 shows a schematic diagram illustrating client-side rendering in accordance with an embodiment of the present invention.

FIG. 8 shows a schematic diagram that illustrates client-side rendering in the virtual mobile infrastructure 200 in accordance with an embodiment of the present invention. In the example of FIG. 8, a remote ANDROID operating system 224 includes a graphics engine 310 and a graphics compositing engine 311. The graphics engine 310 and the graphics compositing engine 311 may comprise services or components provided by the ANDROID system 226 of the remote ANDROID operating system 224. In one embodiment, the graphics engine 310 may comprise the ANDROID SKIA graphics engine for two-dimensional (2D) graphics and the ANDROID OpenGL ES graphics engine for three-dimensional (3D) graphics, and the graphics compositing engine 311 may comprise the ANDROID SurfaceFlinger graphics compositing engine.

Generally speaking, in an ANDROID operating system, the final screen image to be displayed on the touchscreen comprises a plurality of surfaces that are composited together. Each of the surfaces may comprise a screen image for an application. More particularly, each of the remote applications 225 may issue drawing commands, e.g., by making application programming interface (API) calls to the graphics engine 310 to generate a surface (see arrows 320). For example, an application 225 may issue drawing API calls to generate a surface for a background and another application 225 may issue drawing API calls to generate a surface for icons. The graphics engine 310 receives the drawing API calls and generates the corresponding surfaces (see arrows 321). The graphics compositing engine 311 receives the surfaces (see arrows 322) and creates the final screen image by compositing the surfaces together (see arrow 323). In the just-mentioned example, the graphics compositing engine 311 generates a final screen image showing a background and icons, i.e., the composited screen images of the applications 225. The final screen image is stored in a frame buffer for subsequent displaying on the touchscreen. In the case of server-side rendering, a corresponding remote access daemon 251 sends the pixel information of the final screen image to the mobile client device 201. That is, in server-side rendering, the completed final screen image is sent to the mobile client device 201. Because of the relatively large size of the final screen image, server-side rendering consumes a large amount of network bandwidth.

In the case of client-side rendering, the final screen image generated by the remote ANDROID operating system is not forwarded to the mobile client device 201. Instead, screen data for generating the final screen image are sent from the remote ANDROID operating system to the mobile client device 201. There, the screen data are processed to locally generate the final screen image. More specifically, for client-side rendering, drawing API calls made by the remote applications 225 to generate surfaces and the compositing data for compositing the surfaces together are intercepted on the remote ANDROID operating system and redirected to the local ANDROID operating system.

In the example of FIG. 8, client-side rendering is performed by intercepting drawing API calls made by the applications 225. Compositing data for compositing the surfaces together to form the final screen image are also intercepted. The interception of drawing API calls and compositing data may be performed by a hook module running in each individual remote ANDROID operating system 224 at the ANDROID system 226 layer. The hook module may hook API calls to the ANDROID Skia graphics engine for 2D graphics and to the ANDROID OpenGL ES graphics engine for 2D or 3D graphics. The hook module may also hook compositing data for compositing multiple surfaces to generate the final screen image. The hook module may hook surface creation/deletion/locking/unlocking events and each of the surface's attributes, such as size, position, z-order, etc. More specifically, in one embodiment, the hook module may intercept the following:

Surface Creation. For example, hooking the ANDROID SurfaceFlinger to get a a new surface's ID, width, height, and bitmap format.

Surface Deletion. For example, hooking the ANDROID SurfaceFlinger to get a deleted surface's ID.

Surface Lock. For example, hooking surface JNI (Java Native Interface) interface to get the mapping between surface ID and backend buffer's address, such as <surface_id, front_buffer_address, back_buffer_address>.

Surface Unlock. For example, hooking surface JNI interface to the surface unlock event.

Surface Drawing. For example, hooking the ANDROID Skia's primitive API in SkCanvas to get the following relationship: <SK_API, buffer_address>.

Surface Attribute. For example, hooking SurfaceFlinger to get surface attribute change, such as size, position, z-order.

Other data for creating a final screen image may also be intercepted without detracting from the merits of the present invention.

In the example of FIG. 8, a remote access daemon (see 251 in FIG. 6) redirects the intercepted drawing API calls (see arrow 301) and compositing data (see arrow 302) to the mobile client device 201. There, the client application 262 running on the local ANDROID operating system receives the drawing API calls, and makes the drawing API calls to the local graphics engine on the local ANDROID operating system to locally draw the corresponding surfaces 312. A surface compositor 313 of the client application 262 receives the surfaces 312 (see arrow 303) and generates the final screen image (see arrow 304) that is displayed on the touchscreen of the mobile client device 201 by compositing the surfaces 312 together.

More specifically, the client application 262 may create the surfaces 312 with double-buffer (front and back) using the same ID and size as on the remote ANDROID operating system. The client application 262 may then lock the surfaces 312 to bind the front buffer to the context of the ANDROID Skia or OpenGL ES graphics engine, whichever is applicable. The client application 262 unflattens the stream of redirected drawing API calls and executes them, by making the drawing API calls to the applicable graphics engine, to draw the surfaces 312. The client application 262 then unlocks the surfaces 312 to trigger the surface compositor 313 to generate the final screen image by compositing the surfaces 312. The client application 262 thereafter updates the attributes of the surfaces 312 as needed.

In one embodiment, the virtual mobile infrastructure 200 employs a local input method editor (IME) to provide user inputs to a remote ANDROID operating system. This feature of the virtual mobile infrastructure 200 is schematically illustrated in FIG. 9.

Figure 9:
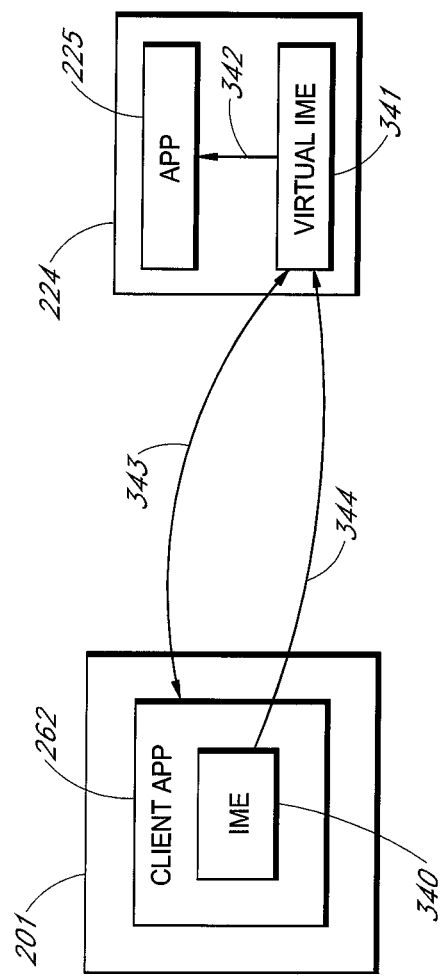
FIG. 9 shows a schematic diagram of a virtual input method editor (IME) operating with a local IME in accordance with an embodiment of the present invention.

In the example of FIG. 9, a user of a mobile client device 201 employs the client application 262 to access a remote application 225 running on a remote ANDROID operating system 224. The application 225 employs a virtual IME 341 to receive user inputs (see arrow 342). The virtual IME 341 may comprise an ANDROID application with IME services. The virtual IME 341 displays its touchscreen keyboard whenever the application 225 requires user inputs. Because the client application 262 is accessing the remote ANDROID operating system 224, the touchscreen keyboard of the virtual IME 341 is also displayed on the mobile client device 201 (see arrow 343) by client-side rendering, for example. When the user needs to enter text input, the client application 262 hides the touchscreen keyboard of the virtual IME 341 from the client mobile device 201 and invokes a local IME 340 that uses a local IME service, for example. This allows the user to enter text inputs via the touchscreen keyboard of the local IME 340. The client application 262 receives the text inputs from the local IME 340, and sends the text inputs to the virtual IME 341 (see arrow 344), which then provides the text inputs to the remote application 225.

FIG. 10, which consists of FIGS. 10A-10F, shows screen shots illustrating an example operation of the virtual IME 341 and the local IME 340 in accordance with an embodiment of the present invention. In the example of FIG. 10, the left hand figures show screen shots of the local ANDROID operating system and the right hand figures show screen shots of the remote ANDROID operating system. As explained, the remote ANDROID operating system is one of a plurality of ANDROID operating systems running on a server computer 211 (see FIG. 2). Accordingly, the remote ANDROID operating system is not running on a tablet and may not have a touchscreen or display screen as shown. FIG. 10 is provided for illustration purposes only.

Figure 10A:
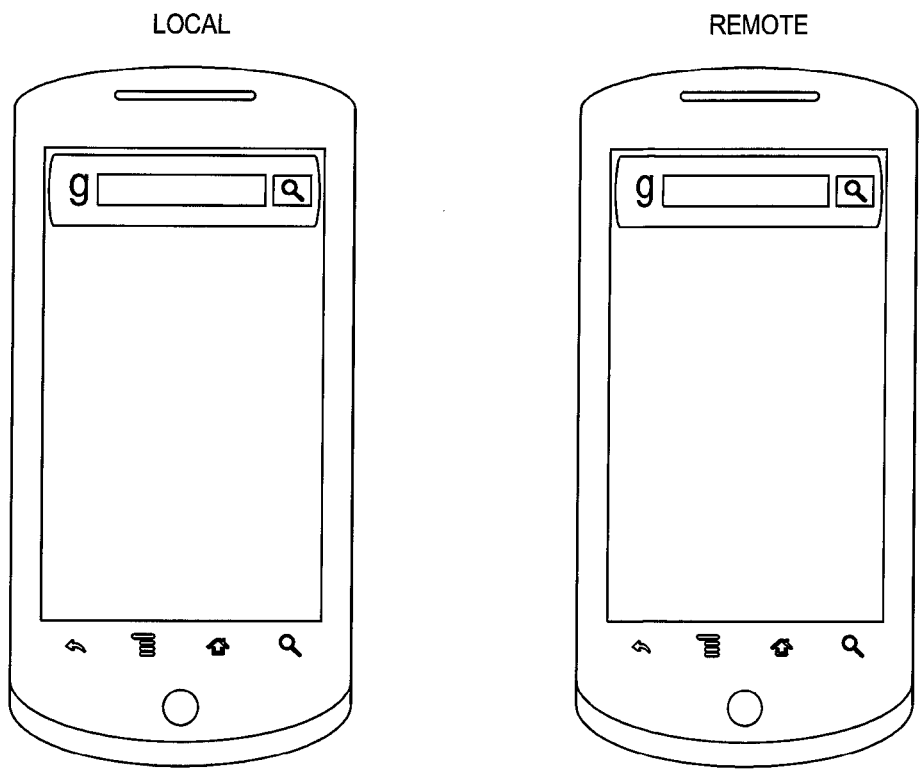
FIG. 10, which consists of FIGS. 10A-10F, shows screen shots illustrating an example operation of a virtual IME and a local IME in accordance with an embodiment of the present invention.

In FIG. 10A, the local ANDROID operating system (on the left) and the remote ANDROID operating system (on the right) are initially displaying the same screen image.

Figure 10B:
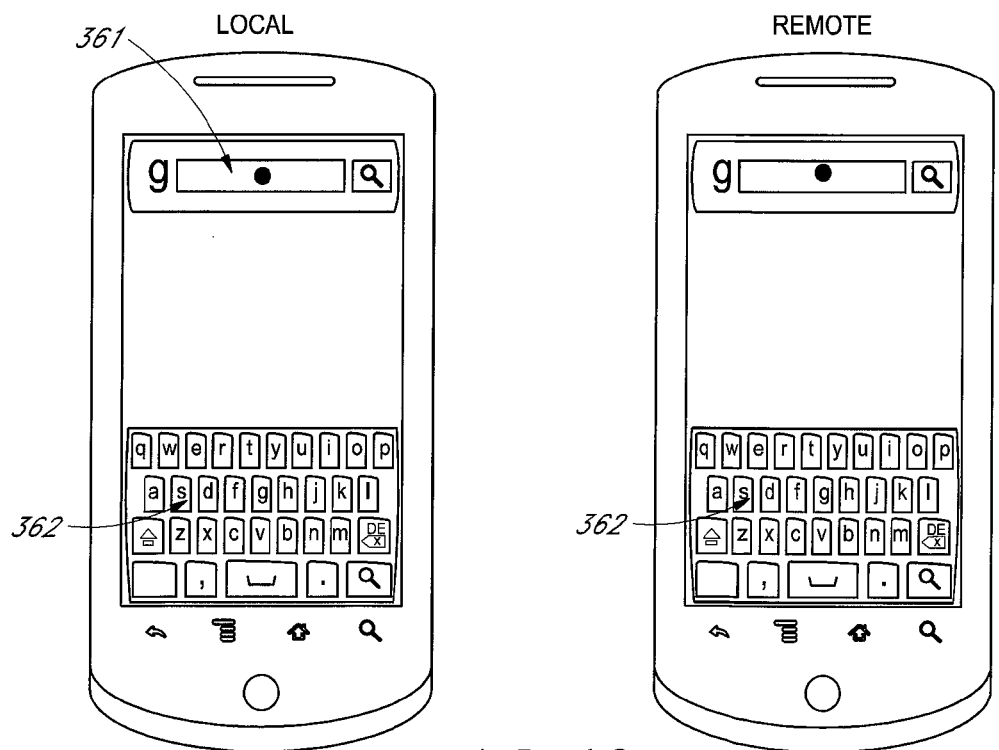

In FIG. 10B, the user touches a text input region 361 on the screen of the local ANDROID operating system. The touch event is passed to the remote ANDROID operating system, which automatically invokes the virtual IME 341 to display a touchscreen keyboard 362. Because the client application 262 is displaying the screen image of the remote ANDROID operating system, the touchscreen keyboard 362 of the virtual IME 341 is also displayed on the local ANDROID operating system. As can be appreciated, using the IME 341 for the remote ANDROID operating system and corresponding remote applications allows for context-sensitive automatic displaying of a touchscreen keyboard.

Figure 10C:
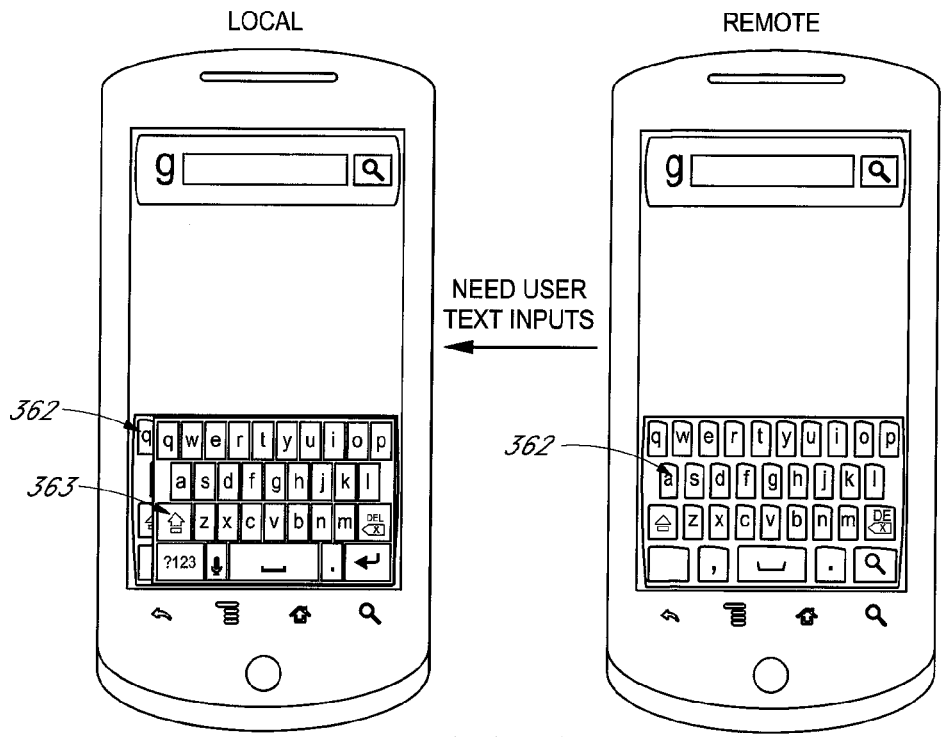

In FIG. 10C, the virtual IME 341 informs the client application 262 that a remote application 225 (e.g., a web browser or searcher) is accepting user text inputs; optionally the virtual IME 341 also informs the client application 262 the preferred keyboard type of the user. In response to receiving the information, the client application 262 automatically invokes the local IME 340, which displays a touchscreen keyboard 363. The touchscreen keyboard 363 of the IME 340 is displayed over the touchscreen keyboard 362 of the remote ANDROID operating system. FIG. 10C shows a portion of the touchscreen keyboard 362 being visible on the local ANDROID operating system for illustration purposes only. In practice, the touchscreen keyboard 363 of the IME 340 is displayed to cover up the touchscreen keyboard 362 of the virtual IME 341. This way, the user will not notice that the remote ANDROID operating system is still displaying the touchscreen keyboard 362 of the virtual IME 341, which is displayed underneath the touchscreen keyboard 363.

Figure 10D:
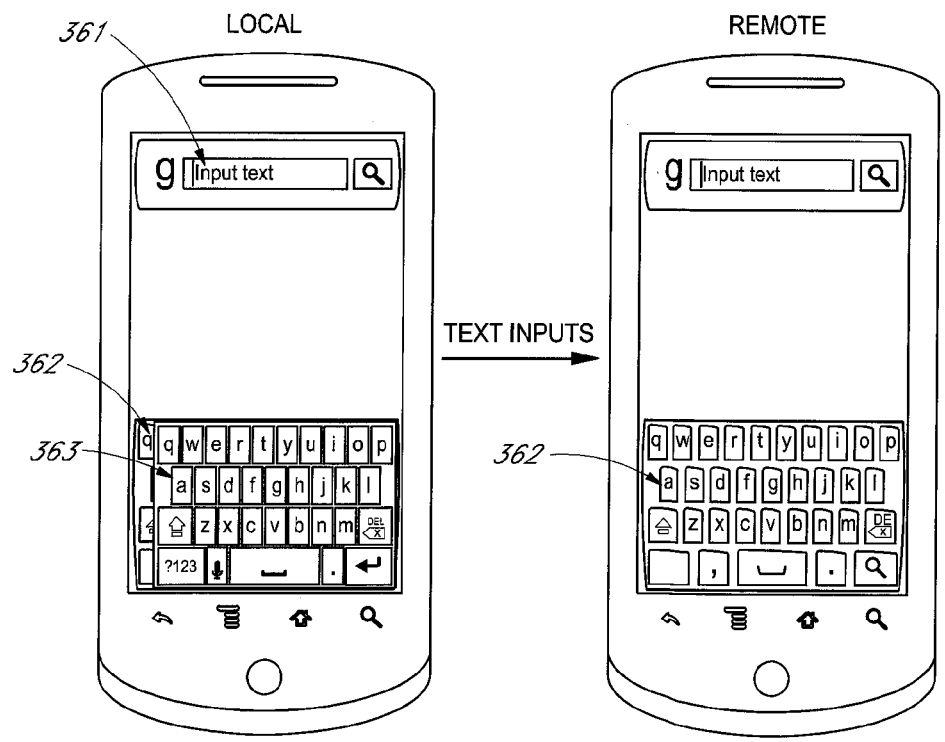

In FIG. 10D, the user enters text into the text input region 361 using the touchscreen keyboard 363 of the IME 340. The client application 262 receives the text inputs from the IME 340, and provides the text inputs to the virtual IME 341. This results in the text inputs being provided to the remote application 225 and being shown on the touchscreen of the remote ANDROID operating system. The screen image of the remote ANDROID operating system is reflected on the local ANDROID operating system. This results in the text inputs appearing in the text input region 361 of the local and remote ANDROID operating systems.

Figure 10E:
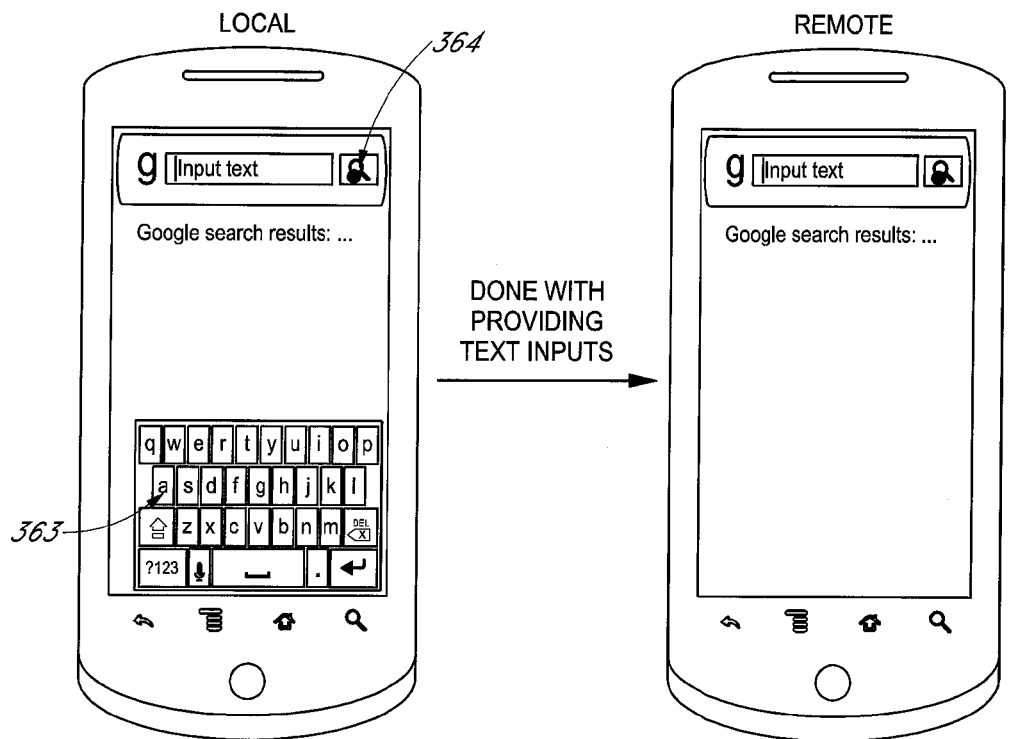

In FIG. 10E, the user performs an action that indicates end of user input. In the example of FIG. 10E, this is performed by the user by touching a "go" or "search" button 364 on the touchscreen of the local ANDROID operating system. The client application 262 informs the remote ANDROID operating system of the user action. In response to the user action, the remote ANDROID operating system dismisses the virtual IME 341, which in turn closes the touchscreen keyboard 362 on the remote ANDROID operating system. Accordingly, the touchscreen keyboard 362 is no longer displayed on the remote and local ANDROID operating systems.

Figure 10F:
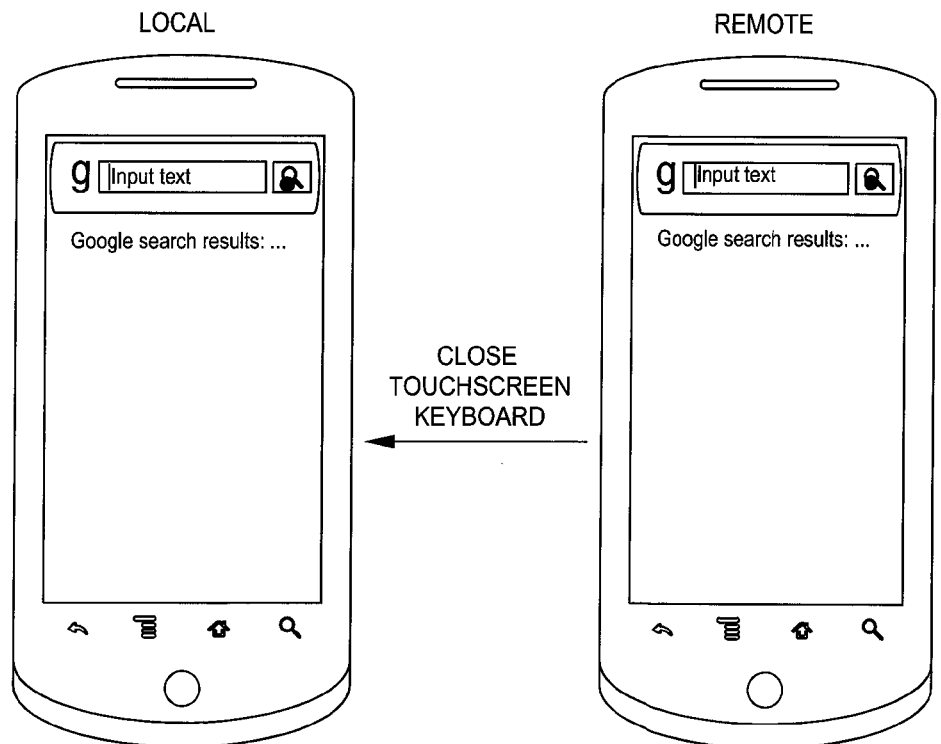

Before closing, the virtual IME 341 so informs the client application 262. In response, as shown in FIG. 10F, the client application 262 dismisses the IME 340 to close the touchscreen keyboard 363.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system comprising:
a server computer comprising a processor, memory, and a storage device, the memory of the server computer comprising instructions that when executed by the processor of the server computer causes the server computer to run a remote mobile operating system that comprises an application layer with applications that run on top of a system layer with a Dalvik process virtual machine that executes a first application being accessed by a user of a mobile client device over a computer network, wherein the remote mobile operating system receives user text inputs from the mobile client device and provides the user text inputs to the first application, and generates a touchscreen keyboard of a remote input method editor (IME) of the remote mobile operating system; and
the mobile client device comprising a processor, memory and a storage device, the memory of the mobile client device comprising instructions that when executed by the processor of the mobile client device causes the mobile client device to run a local mobile operating system, and display a screen image of the remote mobile operating system, wherein the local mobile operating system automatically displays a touchscreen keyboard of a local IME of the local mobile operating system over the touchscreen keyboard of the remote IME in response to information from the server computer that the first application is accepting the user text inputs, wherein the remote touchscreen keyboard from the remote IME is hidden from a user of the mobile device, and wherein the local mobile operating system receives the user text inputs from the touchscreen of the local IME, and provides the user text inputs to the server computer by transmitting from the mobile client device over the computer network to the server computer.

2. The system of claim 1 wherein the mobile client device automatically closes the touchscreen keyboard of the local IME when the touchscreen keyboard of the remote IME is closed on the server computer.

3. The system of claim 1 wherein the mobile client device comprises a smartphone.

4. The system of claim 1 wherein the mobile client device comprises a tablet.

5. The system of claim 1 wherein the local mobile operating system has a system layer that has a Dalvik process virtual machine.

6. The system of claim 1 wherein the user text inputs are received in the server computer by the remote IME and the remote IME provides the text inputs to the first application.

7. A computer-implemented method comprising:
    displaying in a mobile client device a screen image of a remote mobile operating system wherein the remote mobile operating system is one of a plurality of remote mobile operating systems running on a server computer;
    accessing from the mobile client device a remote application running on the remote mobile operating system;
    displaying in the mobile client device a remote touchscreen keyboard of a remote input media editor (IME) of the remote mobile operating system;
    in response to the remote application accepting user text inputs, automatically displaying a local touchscreen keyboard from a local IME of a local mobile operating system running on the mobile client device to receive the user text inputs in the mobile client device, wherein the local touchscreen keyboard of the local mobile operating system is displayed over the remote touchscreen keyboard of the remote mobile operating system, wherein the remote touchscreen keyboard of the remote IME is hidden from a user of the mobile client device;
    transmitting the user text inputs from the mobile client device to the server computer over a computer network;
    receiving by the server computer the user text inputs from the mobile client device; and
    providing, in the server computer, the user text inputs to the remote application running on the remote mobile operating system.

8. The computer-implemented method of claim 7 wherein the remote mobile operating system includes a system layer comprising a Dalvik process virtual machine that executes the remote application.

9. The computer-implemented method of claim 7 wherein the remote mobile operating system and the local mobile operating system each includes a system layer that has a Dalvik process virtual machine.

10. The computer-implemented method of claim 7 wherein the mobile client device is a smartphone.

11. The computer-implemented method of claim 7 wherein the mobile client device is a tablet.

* * * * *